United States Patent [19]

Schmohl et al.

[11] Patent Number: 5,412,977
[45] Date of Patent: May 9, 1995

[54] TURBO MACHINE WITH AN AXIAL DRY GAS SEAL

[75] Inventors: Hans Schmohl, Galgenen; Heinrich Lorenzen, Untersiggenthal, both of Switzerland

[73] Assignee: Sulzer Escher Wyss AG, Zurich, Switzerland

[21] Appl. No.: 59,279

[22] Filed: May 11, 1993

[30] Foreign Application Priority Data

Jul. 2, 1992 [CH] Switzerland .................... 02088/92

[51] Int. Cl.⁶ .................. F01D 3/00; F16J 15/34; G01M 3/28
[52] U.S. Cl. ........................... 73/46; 73/40; 340/605; 415/105; 27/93 R
[58] Field of Search ................... 73/40, 46; 340/605

[56] References Cited

U.S. PATENT DOCUMENTS

| | | | |
|---|---|---|---|
| 3,689,908 | 9/1972 | Ray | 73/209 |
| 3,940,754 | 2/1976 | Weber | 340/605 |
| 4,573,344 | 3/1986 | Ezekoye | 73/46 |
| 4,993,917 | 2/1991 | Kulle et al. | 415/105 |
| 5,028,204 | 7/1991 | Kulle et al. | 415/105 |
| 5,137,284 | 8/1992 | Holder | 277/3 |
| 5,137,284 | 5/1992 | Lorenzen | 415/105 |
| 5,141,389 | 8/1992 | Bear et al. | 415/30 |
| 5,170,659 | 12/1992 | Kemp | 73/46 |

FOREIGN PATENT DOCUMENTS

| | | | |
|---|---|---|---|
| 3925403 | 1/1991 | Germany | F16J 15/34 |
| 2204366 | 11/1988 | United Kingdom | 73/46 |
| WO91/06793 | 5/1991 | WIPO | F16J 15/00 |
| WO91/09240 | 6/1991 | WIPO | F16J 15/00 |

Primary Examiner—Hezron E. Williams
Assistant Examiner—J. David Wiggins
Attorney, Agent, or Firm—Sandler Greenblum & Bernstein

[57] ABSTRACT

In a turbo machine, for example, a turbo compressor, the rotor shaft extends through and is sealed relative a housing via dry gas seals in which a seal clearance is achieved between a rotating, sealing body and a non-rotating sliding body in which the inner side of the dry gas seal is charged with a barrier gas, with the leakage of the dry gas seal being dammed via a back-up plate and the dynamic pressure is monitored via a pressure inspection device, wherein due to increasing dynamic pressure an alarm is given off or the turbo machine is automatically shutdown without delay so that the exit of gas, particularly of toxic or explosive gas from the inner area of the housing of the turbo machine is avoided, wherein, via the use of multiple seals the leakage pressure of one of the inner dry gas seals can initiate a warning or alarm signal and via the leakage pressure of the outer dry gas seal, the turbo machine can be shut down.

23 Claims, 2 Drawing Sheets

TURBO MACHINE WITH AN AXIAL DRY GAS SEAL

CROSS REFERENCE TO RELATED APPLICATION

This application claims the priority of Swiss Application No. 02 088/92-5 filed Jul. 2, 1992, the disclosure of which is incorporated herein by reference in its entirety.

BACKGROUND OF THE INVENTION

1. Field of the Invention

This invention pertains to a turbo machine having a driven rotor shaft extending at least on one side through the machine housing wherein the rotor shaft is provided with an axial seal arrangement with at least one dry gas seal which is impinged or charged with barrier gas and whose leakage is eliminated via a leakage conduit.

2. Background and Material Information

Machines of this type are known, for example from German DE 39 25 403 and serve for example, as turbo compressors or gas turbines. In this type of machine the rotor of the turbo machine is retained in a closed housing whose inner area is under high gas pressure.

The passage of the rotor shaft, through the housing to the outside or to an intermediate chamber is sealed via a seal arrangement in order to prohibit the exiting of the gas under pressure from the inner area. As a rule, when both sides of the rotor, carried on the shaft, extend through the housing such a seal arrangement is provided on both sides thereof, or in the case of a single sided axial opening, with machines of the overhang type, such a seal arrangement is utilized only on this single opening.

Dry gas seals, that are impinged or charged with a barrier gas have proven themselves to be particularly low in friction and low in losses, wherein the sliding surface of a sliding ring is pressed against a corresponding sealing surface, while maintaining a minimum clearance so as to minimize the exit of the pressure gas from the inner area whereby the leakage of the seal is kept at an as small as possible value and at the same time a clearance is produced so as to permit non-contact running or operation of the seal. The small, though still remaining leakage is, as a rule, channeled or removed to the outside. At low pressures, as a rule a single dry gas seal is sufficient. At higher pressures however and in order to obtain increased safety, the primary inner dry gas seal is followed by a secondary outer dry gas seal of analogous construction which seals the inner leakage area against the outside. This outer dry gas seal preferably is only called into action and is effective only when the primary leakage is excessive, particularly if there is a defect in the primary inner dry gas seal. If necessary more than two dry gas seals can be arranged in tandem.

In turbo machines which process dangerous gases, particularly explosive or toxic gases, it is especially important and urgent that the exit or leakage of these dangerous gases, under pressure, is prevented from the inner housing areas or to reduce same to a minimal value in order to avoid a catastrophe. In order to achieve same, on dangerous areas of the machine, for example in the proximity of the gas ducts, suitable gas sensors are provided which preferably have specific detection sensitivities for the gas to be detected and which, upon exceeding a specific gas concentration, emanate a warning or alarm signal or initiate suitable countermeasures. This however requires additional complicated devices which in addition can react initially only when already sufficient amounts of gas have exited from the housing in order to initiate the release of a signal. The required time delay however is often insufficient in order to totally prevent a catastrophe.

SUMMARY OF THE INVENTION

The task or object of this invention is to avoid the previously noted disadvantages of the prior art and particularly to further develop turbo machines of the previously noted type so that a defect in the dry gas seal and an impermissible exit of the gas through the shaft seals is signaled and prohibited as quickly as possible without time delay in order to provide increased safety.

According to the invention, this task is achieved on the leakage side of the dry gas seal by providing a stop mechanism for stopping the leakage of the seal, as well providing a pressure inspection device for observing the dynamic pressure of the leakage of the seal which initiates a signal when a predetermined dynamic pressure is exceeded.

Advantageously, the pressure signal is used in order to immediately shut off the turbo machine in order to minimize the gas pressure in the inner area and to prevent the exit of gas without any time delay.

In the construction of a tandem or multiple seal arrangement it is also advantageous to observe the inner leakage pressure and thus be able to signal when a threshold value is exceeded, for example via a warning signal or an alarm signal, during the increase of the outer leakage pressure, as a result of which the turbo machine is immediately automatically shut off.

Specifically, the stop mechanism can take the form of a circular ring-shaped backup or dam plate which surrounds the rotor shaft or takes the form of a pressure stop valve that is located in the leakage conduit.

In those arrangements where at least two dry gas seals are arranged in tandem at least one of these seals is provided with means for stopping the leakage. If desired, the outer dry gas seal is provided with a dam arrangement which causes the turbo machine to shut down when a predetermined dynamic pressure is exceeded. In addition, the inner dry gas seal can be provided with a pressure stop valve which causes a warning or alarm signal to be triggered when a predetermined dynamic pressure is exceeded.

BRIEF DESCRIPTION OF THE DRAWINGS

The invention will now be described with reference to the several enabling embodiments in more detail in which.

DETAILED DESCRIPTION OF THE PREFERRED EMBODIMENTS

Figure 1:
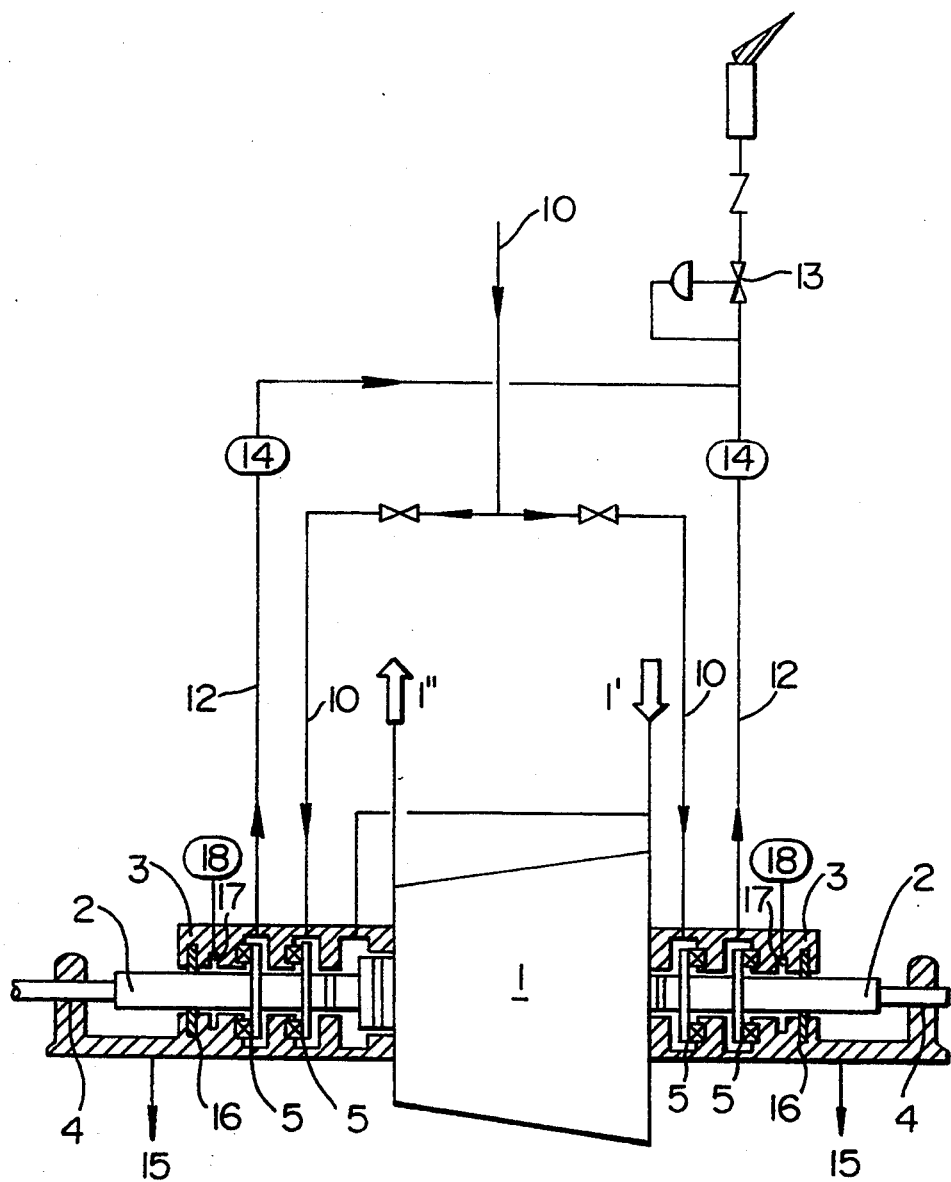
FIG. 1 shows turbo machine installation with dry gas seals in a schematic showing.

The example shown in the several figures portrays a turbo machine arrangement having a turbo compressor 1 whose rotor shaft 2 extends through the turbo machine housing 3 which is shown in detail only in the area where the rotor shaft exits therefrom on both sides, and which is suitably journalled, for example, in magnetic bearings 4. Relative to housing 3, rotor shaft 2 is sealed via dry gas seals 5 which reduce the exit of the gas, from the inner area of the turbo machine as well as at the gas entry side 1' and at the gas exit side 1", to harmless leakage. Thus, FIG. 1 discloses a tandem seal at both ends of shaft 2, with each such tandem seal consisting of two dry gas seals 5. With this construction also avoided is that gas, which is under a predetermined pressure within the machine, reaches the surrounding area which, particularly in the case of a toxic or explosive gas under pressure, can cause a dangerous situation.

Figure 2:
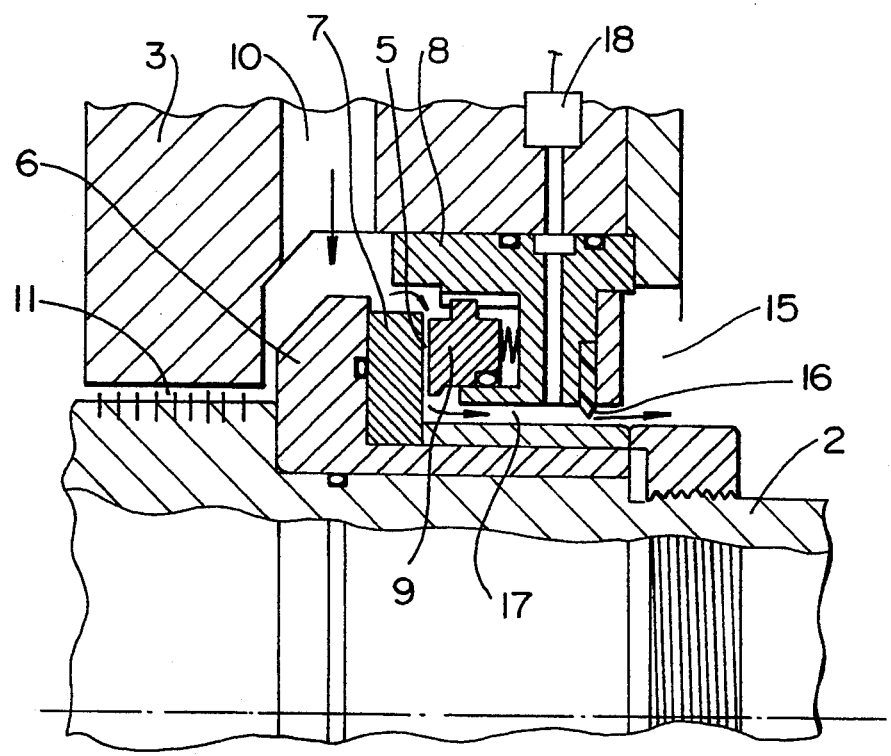
FIG. 2 shows a detailed section of a single dry gas seal arrangement and a downstream restriction open to atmosphere with the shaft arrangement for use in the turbo machine installation as shown in FIG. 1.

Seal arrangement 5 utilizes, as is particularly well shown in FIG. 2, a co-rotating shaft bushing 6 which carries a sealing body 7, for example, of silicon carbide or another suitable material. On the opposite side the seal utilizes a stationary seal holder 8 which is retained in a housing 3 whose inner surface is provided or carries an axially slightly movable sliding or friction ring 9 for example having a sliding surface of a carbon-ceramic material.

A dry and clean barrier gas, at a predetermined pressure which is higher than the pressure in the inner areas of the housing, is introduced to the inner dry gas seal 5 via a conduit 10. This barrier gas thereby blocks, on one side, the exit of the gas under pressure from interior of the housing wherein an additional seal 11 is utilized either as a labyrinth seal or as an additional dry gas seal, with this seal being located on the inner side of the rotor shaft exit area. In addition, the barrier gas is channeled to the backside of the sliding ring 9 and presses ring 9, if necessary, augmented by spring pressure, against the rotating sealing body 7 at shaft bushing 6 so that a gas film is produced between the sliding ring and the sealing body with a minimal clearance. The leakage through dry gas seal 5, that is through the seal clearance is removed in a harmless manner for example by being collected or flared off. Leakage conduit 17 further utilizes a stop mechanism or device in the form of a ring shaped backup plate which surrounds shaft 2 together with a measuring device 18 which produces a signal as soon as the leakage in conduit 17 exceeds a predetermined value and thereby alerts the operating personnel relative to a possible or beginning defect in the dry gas seal or which automatically shuts off the turbo machine without delay.

Figure 3:
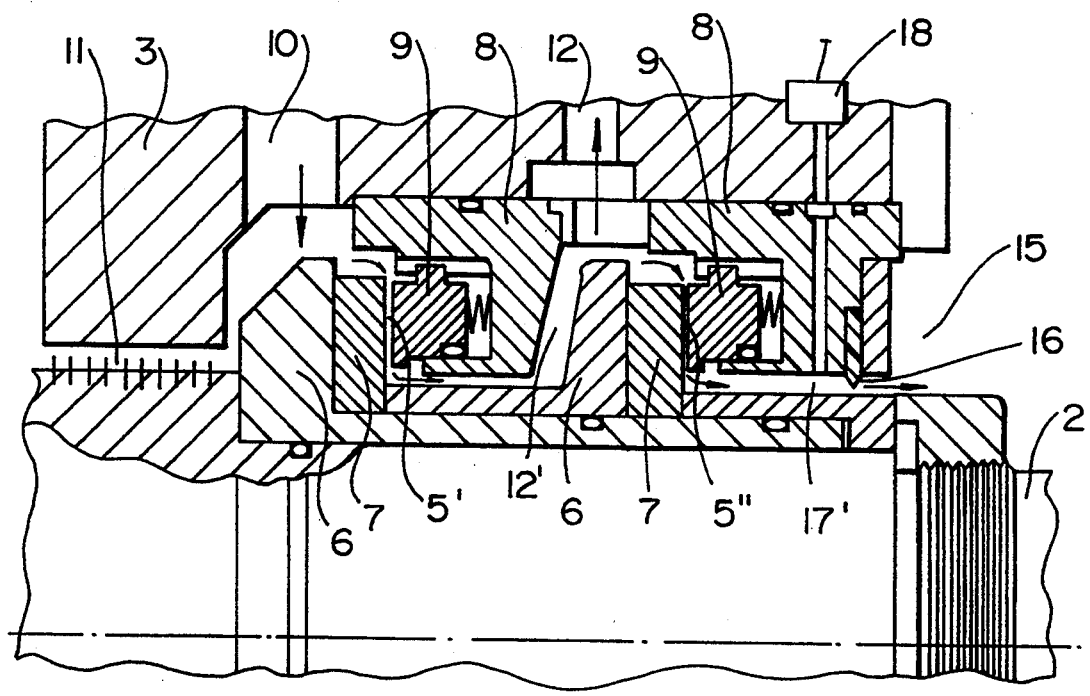
FIG. 3 shows a detailed section of a dry gas seal arranged in tandem and a downstream restriction open to atmosphere, for the same use.

In the embodiment shown in FIG. 3, an outer secondary dry gas seal 5" follows the inner primary dry gas seal 5' and is built in an analogous manner and operates between the primary leakage area 12' and the outside 15 of the housing. As long as the leakage through the primary leakage conduit 12 is minimal the secondary dry gas seal 5" operates on idle since it has to overcome only a small pressure difference which is provided via a pressure stop valve 13 in primary leakage conduit 12. However, as soon as the leakage in primary leakage area 12' increases, for example as a result of the slow deterioration or due to a defect in primary dry gas seal 5' a signal is produced by pressure measurement apparatus 14 in primary leakage conduit 12 so that when the pressure produced via pressure stop valve 13 exceeds a predetermined value the operating personnel is warned and alarmed, while on the other hand the secondary dry gas seal 5" performs the function of a safety seal and absorbs the increasing pressure difference. In case of a defect in primary dry gas seal 5' the secondary dry gas seal 5" comes into action and prohibits the exit of gas from the inside of the housing. Normally in this manner, even in the case of the defect of the primary inner gas seal, sufficient safety is provided against the exit of gas and a certain time is available to determine the cause of the increased primary leakage without having to immediately shut down the installation.

It is however possible that the secondary outer gas seal which normally runs without pressure or idles, becomes, in view of long usage, less effective or defective without this being known since this secondary seal under normal usage has no function per se as long as the primary inner-gas seal operates without difficulty. In this case, the outer tandem gas seal would fail if the inner gas seal becomes defective and dangerous gas would escape. In order to avoid this, a circular ring-shaped back-up baffle or dam plate as restriction 16 is provided on the outer side of the outer secondary dry gas seal 5" which dams the secondary leakage relatively to a pressure inspection device 18 which is attached to leakage conduit 17 which in turn is attached to secondary leakage area 17'. Thus, the area downstream of restriction 16 is connected to atmosphere, i.e., to the outside 15 of the housing. As soon as the dynamic pressure in pressure inspection device 18 exceeds a predetermined pressure value, turbo machine 1 is automatically shut down, directly via the secondary leakage path, that is without a detour relative to other measuring devices and without time delay. Thus, a dangerous situation is prevented even with the unlikely possibility of simultaneous breakdown of the primary and secondary gas seals so as to reduce this dangerous situation with the highest possible safety.

Preferably, even the secondary outer dry gas seal 5" is charged with a small constant pressure that is produced by means of a pressure stop valve 13. This small pressure is utilized to check the functionality of secondary dry gas seal 5" at all times, even when the primary dry gas seal 5' is still in satisfactory condition.

As an alternative to pressure stop valve 13, in an analogous manner, to secondary seal 5", a back-up plate could be utilized after primary seal 5' with a corresponding pressure measurement for overseeing the primary leakage.

The measurement of the dynamic pressure can be achieved via direct pressure measurement or through a measurement value depending from the pressure itself, for example the throughput value which is obtained from the pressure difference and the resistance to flow within the conduits.

The dynamic pressure can selectively serve to alarm the operating personnel or provide for the automatic shutdown of the installation. With the construction of a tandem or multiple seal arrangement an alarm signal or a shutdown order can be alternatively produced through each seal, however especially via the dynamic pressure of the inner seal, or in case of three or more seals, the inner seals, an alarm signal can be produced and via the dynamic pressure of the outer seal the entire machine installation can be automatically shut down.

While there are shown and described present preferred embodiments of the invention, it is to be distinctly understood that the invention is not limited thereto, but may be otherwise variously embodied and practiced within the scope of the following claims.

What is claimed:

1. A turbo machine, such as a gas turbine or a turbo compressor, having a barrier gas at high pressure, a high-speed rotating shaft in a machine housing, and including an axial shaft seal arrangement in said housing wherein said shaft seal arrangement comprises:

at least one dry gas seal(s), which consists of a rotating sealing body rotating with said shaft and of a non-rotating sliding ring in said housing for permitting planned limited leakage of said barrier gas through a sealing gap between said rotating sealing body and said non-rotating, axially-sliding ring to a low pressure area;

a further restriction being located between said housing and said shaft, said restriction taking the form of a circular orifice surrounding said shaft with a small clearance, but not touching said shaft, whereby said further restriction is located downstream of said dry gas seal in said low pressure area and define a chamber towards said dry gas seal, where, via a reduced pressure level, said pressure increases with increasing leakage through said dry gas seal; and a pressure inspection device, said pressure inspection device being connected to said chamber for detecting changes of said planned limited leakage by means of different pressure indications and for providing a signal when a predetermined pressure is exceeded.

2. The turbo machine of claim 1, wherein said pressure inspection device is so arranged as to shut-off said turbo machine when a predetermined pressure in said chamber is exceeded.

3. The turbo machine of claim 1, wherein said pressure inspection device is so arranged as to trigger one of an alarm and warning signal as soon as the pressure in said chamber exceeds a predetermined threshold value.

4. The turbo machine of claim 2, wherein the pressure inspection device is so arranged as to trigger one of an alarm and warning signal as soon as the pressure in said chamber exceeds a predetermined threshold value.

5. The turbo machine of claim 1, wherein said further restriction takes the form of a circular ring-shaped backup plate which surrounds said rotor shaft.

6. The turbo machine of claim 2, wherein said further restriction takes the form of a circular ring-shaped backup plate which surrounds said rotor shaft.

7. The turbo machine of claim 1, wherein said pressure inspection device takes the form of a pressure stop valve which is continued as a leakage conduit.

8. The turbo machine of claim 2, wherein said pressure inspection device takes the form of a pressure stop valve which is continued as a leakage conduit.

9. The turbo machine of claim 1, wherein said shaft seal arrangement utilizes at least two dry gas seals arranged in tandem, with at least one of said seals being followed downstream by said further restriction for defining said chamber.

10. The turbo machine of claim 2, wherein said shaft seal arrangement utilizes at least two dry gas seals arranged in tandem, with at least one of said seals being followed downstream by said further restriction for defining said chamber.

11. The turbo machine of claim 3, wherein said shaft seal arrangement utilizes at least two dry gas seals arranged in tandem, with at least one of said seals being followed downstream by said further restriction for defining said chamber.

12. The turbo machine of claim 5, wherein said shaft seal arrangement utilizes at least two dry gas seals arranged in tandem, with at least one of said seals being followed downstream by said further restriction for defining said chamber.

13. The turbo machine of claim 7, wherein said shaft seal arrangement utilizes at least two dry gas seals arranged in tandem, with at least one of said seals being followed downstream by said further restriction for defining said chamber.

14. The turbo machine of claim 9, wherein an outer one of said dry gas seals is followed downstream by said further restriction by means of which said turbo machine can be shut down when a predetermined pressure is exceeded in said chamber.

15. The turbo machine of claim 10, wherein an outer one of said dry gas seals is followed downstream by said further restriction by means of which said turbo machine can be shut down when a predetermined pressure is exceeded in said chamber.

16. The turbo machine of claim 11, wherein an outer one of said dry gas seals is followed downstream by said further restriction by means of which said turbo machine can be shut down when a predetermined pressure is exceeded in said chamber.

17. The turbo machine of claim 12, wherein an outer one of said dry gas seals is followed downstream by said further restriction by means of which said turbo machine can be shut down when a predetermined pressure is exceeded in said chamber.

18. The turbo machine of claim 13, wherein an outer one of said dry gas seals is followed downstream by said further restriction by means of which said turbo machine can be shut down when a predetermined dynamic pressure is exceeded.

19. The turbo machine of claim 9, wherein an area between two of said dry gas seals is connected to a pressure stop valve by means of which one of a warning and alarm signal is given off when a predetermined pressure is exceeded.

20. The turbo machine of claim 10, wherein an area between two of said dry gas seals is connected to a pressure stop valve by means of which one of a warning and alarm signal is given off when a predetermined pressure is exceeded.

21. The turbo machine of claim 11, wherein an area between two of said dry gas seals is connected to a pressure stop valve by means of which one of a warning and alarm signal is given off when a predetermined pressure is exceeded.

22. The turbo machine of claim 14, wherein an area between two of said dry gas seals is connected to a pressure stop valve by means of which one of a warning and alarm signal is given off when a predetermined pressure is exceeded.

23. The turbo machine of claim 15, wherein an area between two of said dry gas seals is connected to a pressure stop valve by means of which one of a warning and alarm signal is given off when a predetermined pressure is exceeded.

* * * * *